March 4, 1969 R. G. POFF 3,430,380
TRIGGER FOR A SPRING-TYPE MOUSETRAP
Filed Jan. 13, 1967
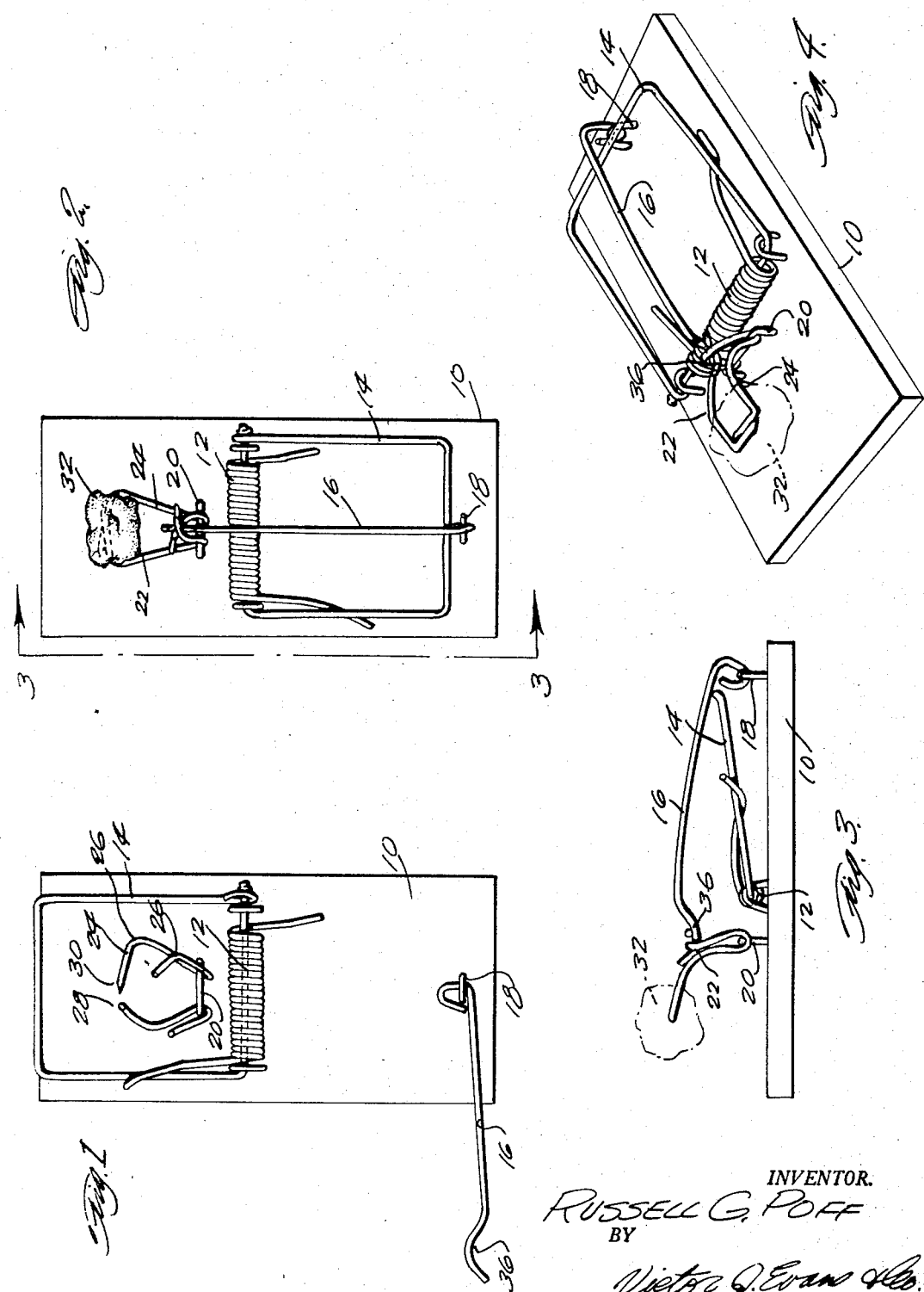
INVENTOR.
RUSSELL G. POFF
BY

United States Patent Office 3,430,380
Patented Mar. 4, 1969

3,430,380
TRIGGER FOR A SPRING-TYPE MOUSETRAP
Russell G. Poff, Rte. 1, Box 17, Riner, Va. 24149
Filed Jan. 13, 1967, Ser. No. 609,139
U.S. Cl. 43—81                          1 Claim
Int. Cl. A01m 23/24

ABSTRACT OF THE DISCLOSURE

An improved trigger for a spring-type mousetrap in which a pair of wire bait holders are loosely mounted on a staple on the mousetrap base. The bait holders form a pair of bent fingers, one finger of each pair mutually engaging the bait and the other finger of each pair mutually engaging the free end of a lever. Upon the bait being eaten away from the bait engaging fingers, the lever trips to swing a clamp to the trap position.

---

The present invention relates to improved mousetrap construction and more particularly relates to an improved trigger means for a spring-type mousetrap. It has often been discovered that baited mousetraps have had the bait eaten off by mice and that the trap failed to trip even though the bait had been consumed by a mouse. It is contemplated within the present invention to provide a pair of wire bait holders shaped as two bent fingers and having one finger of each pair for mutually engaging the bait while the other finger of each pair mutually engages the free end of the lever, so that upon the bait being partially eaten and failure of the lever to trip, then upon continual eating of the bait from the engaging fingers, the lever trips to swing the clamp to the trap position.

A further object of the present invention is to provide a more efficient mousetrap for catching mice.

The above and other objects and advantages of the invention would become apparent upon full consideration of the following detailed description and accompanying drawings in which:

FIGURE 1 is a plan view of the improved trigger mechanism of the mousetrap according to the preferred embodiment of the present invention.

FIGURE 2 shows the manner in which the improved trigger is baited and the lever engages a pair of wire bait holders, in accordance with the present invention.

FIGURE 3 is a side elevational view taken along lines 3—3 of FIGURE 2, and

FIGURE 4 is a prospective view showing the pair of wire bait holders set in accordance with practicing the present invention.

Referring now to the drawings, there is shown a mousetrap base 10 on which is mounted a coil spring 12 in a well-known manner, and a pivotally mounted U-shaped clamp 14 actuated and urged into a trap or clamping position by the coil spring 12. In FIGURE 1 the clamp 14 is shown in the trap position. At the other end of the base as shown there is articulately mounted a lever 16 from a pin 18, and the free end of the lever 16 extends across coil spring 12 reaching the environs of a staple 20.

From the staple 20 there is supported or mounted in engaging relation a pair of wire bait holders 22, 24, the bait holders comprising lengths of wire reversely bent intermediate their ends to loosely receive the staple 20 and to provide pairs of legs having free end portions bent essentially about 90 degrees at 26, 26 as shown with respect to one pair of the legs to form bait holding and lever engaging fingers, and the bait is used to fix the relative orientation of the holders when engaging hook 36. The bait holding fingers 28, 30 which are located on the longer legs of the pair of bait holders 22, 24, are provided to engage a piece of bait, such as cheese 32 or the like, as shown diagrammatically in the drawings in FIGS. 2–4.

The shorter legs of the bait holders have corresponding finger ends which engage the hook receiving portion 36 of the lever 16, as illustrated in FIG. 3, and each of these finger ends specifically engages the receiving portion 36.

In the event that the bait fails to release the lever 16 upon being partially eaten by a mouse, upon continued eating of the bait 32, the bait becomes disengaged from finger ends 28, 30 singly or in combination so that the bait releases the finger ends of the bait holders from the hook-receiving portion 36 of the lever 16, so that the lever 16 trips to swing the clamp 14 into the trap position illustrated in FIG. 1.

The staple 20 is mounted and secured to the base 10 near the coil spring 12, and the bait is engaged by the longer fingers of the bait holders, while the shorter pair of fingers engages the lever at the hook-receiving portion 36, as described above.

What is claimed is:

1. An improved trigger for a mousetrap of the type comprising a base member, a clamp member pivotally mounted on the base, a spring member mounted on the pivotal axis of said clamp for urging said clamp from a set position to a clamping position, a lever member pivotally mounted on the base for holding said clamp in set position, a staple member mounted on said base adjacent the pivot axis of said clamp, and a trigger member releasably engaging said lever for holding said clamp in set position, said trigger comprising a pair of cooperating bait holders, each of said pair of bait holders being formed from a length of wire reversely bent intermediate its ends to provide a looped portion loosely engaging said staple and a pair of legs, each of said legs having free end portions bent substantially normal to the plane thereof to provide a pair of spaced fingers, one finger of each pair of bait holders being adapted to mutually engage a bait to fix the relative orientation thereof, and the other finger of each pair of bait holders being adapted to releasably engage the free end of said lever when said bait fixes the relative orientation of said one pair of fingers, the bait-engaging fingers, being longer than the lever-engaging fingers, whereby when a mouse disturbs the bait the lever trips to swing the clamp to the clamping position.

References Cited
UNITED STATES PATENTS

| | | | |
|---|---|---|---|
| 995,095 | 6/1911 | Ross et al. | 43—81 |
| 2,188,696 | 1/1940 | Woodroffe | 43—81 |

WARNER H. CAMP, Primary Examiner.

U.S. Cl. X.R.

46—65